Patented Oct. 4, 1938

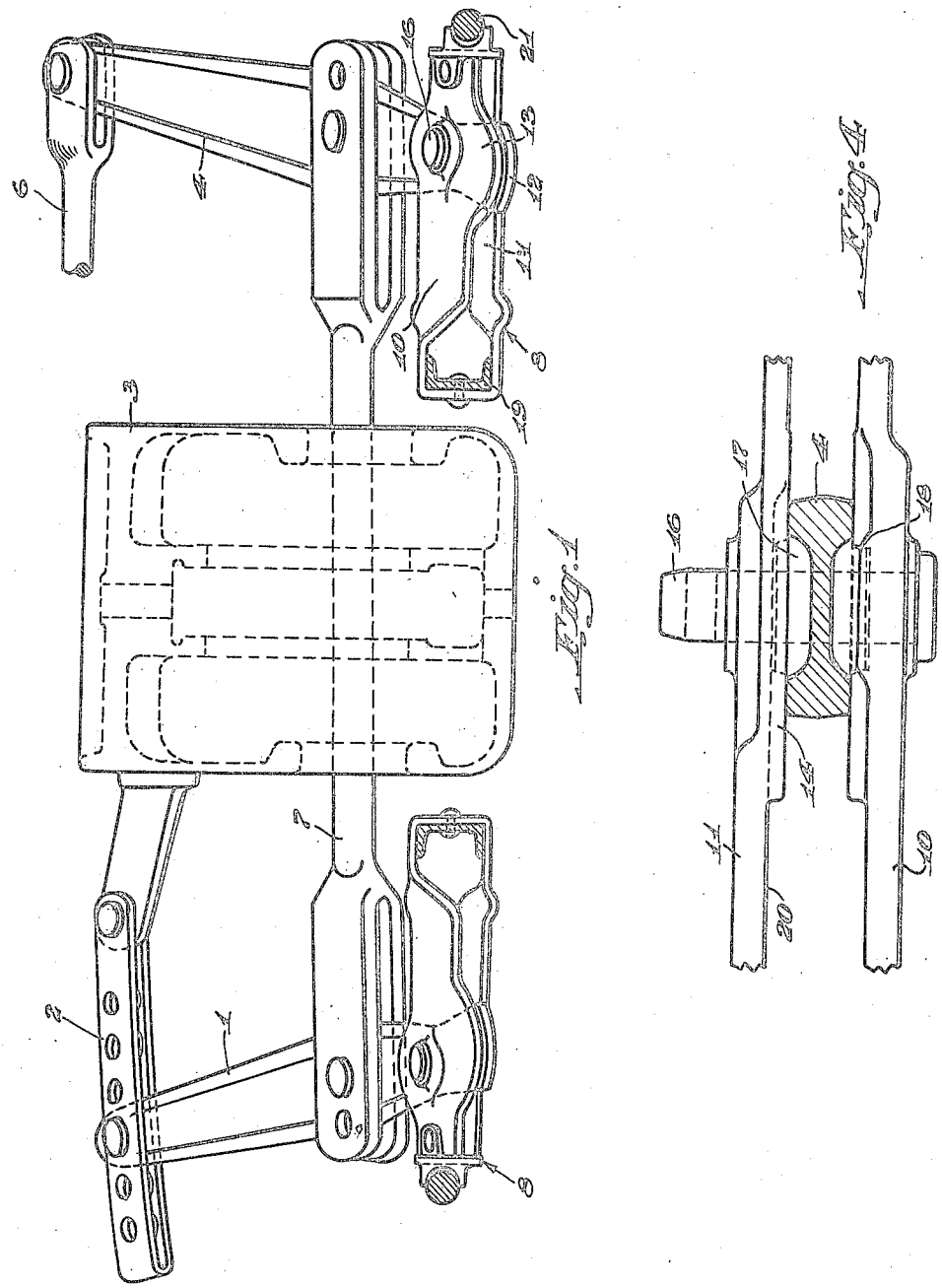

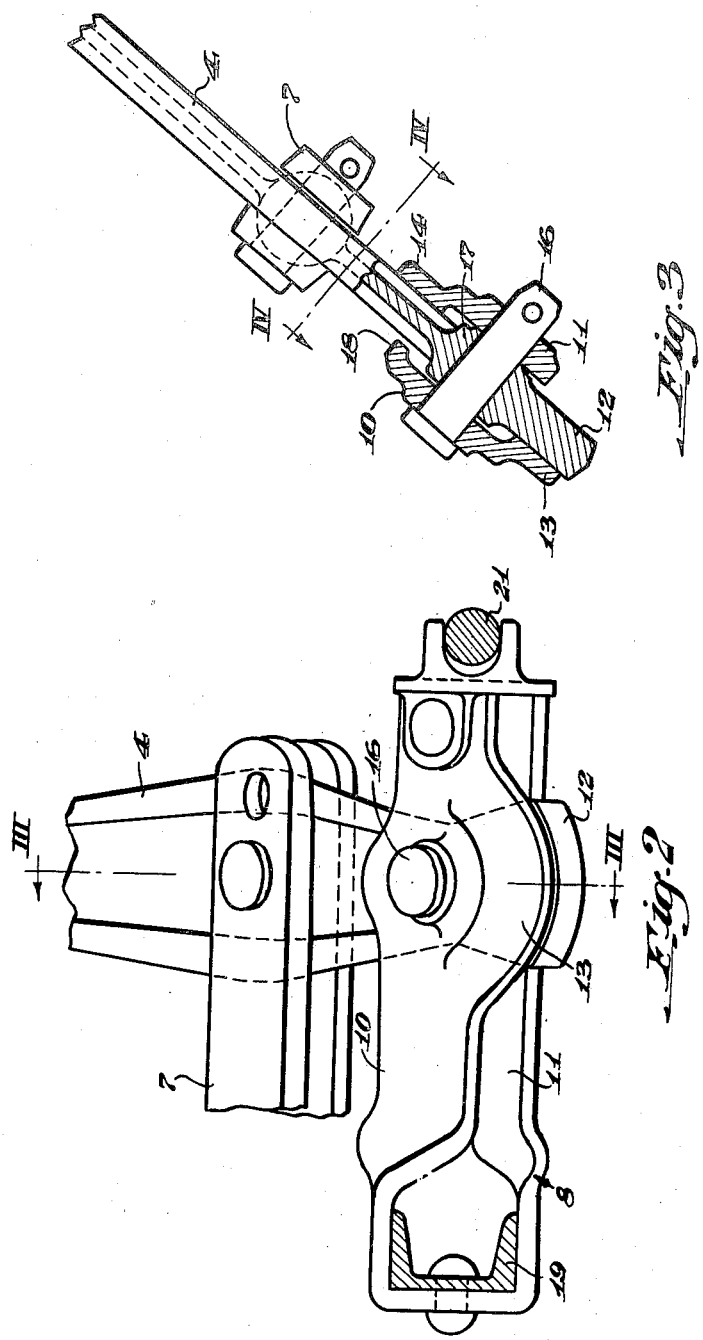

2,132,222

UNITED STATES PATENT OFFICE 2,132,222

BRAKE BEAM STRUT AND LEVER ASSEMBLY

Frederic Schaefer, Pittsburgh, Pa.

Application August 28, 1937, Serial No. 161,397

11 Claims. (Cl. 188—231)

This invention relates to railway car brake rigging, and more particularly to the assembly of truck levers and brake beam struts.

It has been the general practice to connect the lower ends of inclined railway car brake levers by a connecting rod disposed below the truck bolster, to connect the brake beam struts to the levers above the rod at their center holes, and to connect the pull rods to the top holes of the levers. In such cases the weight on the opposite ends of the levers tends to balance them in their inclined position in the brake beam struts by which they are supported. Lately, spring plankless trucks have been coming into wider use, and in such trucks the connecting rod extends through the truck bolster with its ends connected to the brake levers above their lower ends which are connected to and supported by the brake beam struts. As the weight of the connecting rod and of the brake rigging attached to the upper ends of the inclined levers tends to force their upper ends downwardly, the lower ends of the levers are canted in the brake beam struts and therefore cut into the sides of the struts and wear the levers, struts and pivot pins. Also, with spring plankless trucks it is more difficult to use safety supports for catching and supporting the brake beams in case they drop.

It is among the objects of this invention to provide railway car brake rigging, especially suitable for spring plankless trucks, in which the brake levers are prevented from canting in the brake beam struts, and in which the levers and struts are dependably connected and prevented from separating should their connecting pins be lost.

In accordance with this invention a bifurcated brake beam strut is provided with aligned openings in its inclined walls between which a brake lever is received and attached. The lever is provided with an opening in line with the strut openings, and a pivot pin extends through all of these openings for connecting the lever to the strut of the brake beam which is suspended from the truck side frames by brake hangers. The lower edge portion of the strut's upper wall projects inwardly to bear against the upper surface of the lower end of the lever to prevent the weight on the upper portion of the lever from forcing its upper end downwardly and canting the lever in the strut. In place of this, or in addition to it, the upper edge of the lower wall of the strut may be provided with an inwardly projecting portion for bearing against the lower surface of the lever above the pin for the same purpose. It is also preferred to make the portion of the lever in the strut slot thicker than the rest of the lever so that in case the pin is lost the boss thus formed will strike the inwardly projecting portion of the upper wall of the strut and thereby prevent the lever from slipping down through the strut. Such a boss also prevents the brake beam from falling in case the hangers break and the pivot pin is lost, because the inwardly projecting portion of the strut above the pin will engage the top of the boss and hang on the lever.

The preferred embodiment of the invention is illustrated in the accompanying drawings in which Fig. 1 is a fragmentary side view of railway car brake rigging for a spring plankless truck; Fig. 2 is an enlarged view of the right-hand lever and strut; Fig. 3 is a vertical section taken on the line III—III of Fig. 2; and Fig. 4 is an enlarged fragmentary horizontal section taken on the line IV—IV of Fig. 3.

Referring to Fig. 1 of the drawings, a dead lever 1 is pivotally connected at its upper end to a bracket 2 pivoted to the top of a truck bolster 3. On the other side of the bolster the upper end of the live lever 4 is pivotally connected to a rod 6 that is actuated by a piston (not shown) that operates the brakes. The intermediate portions of these two levers are pivotally connected by a connecting rod 7 that extends through the truck bolster. The levers are supported at a 40° angle from their lower ends which are pivoted in the bifurcated struts 8 of brake beams suspended by the usual hangers from the truck side frames (not shown).

In brake rigging as described thus far it will be seen that the weight of actuating rod 6, dead lever bracket 2, connecting rod 7 and the levers themselves tends to pull the upper ends of the levers downwardly and thereby cant their lower ends in the bifurcated struts. If allowed, such canting would result in unequal wear on the pin and lever and a cutting into the inclined walls 10 and 11 of the strut.

This dangerous and undesirable condition is corrected by this invention, a feature of which is that the lower edge portion of upper wall 10 of each strut projects inwardly to bear against the upper surface of the lower end of the lever to prevent that end from being tilted upwardly. Preferably, as shown in Figs. 2 and 3, the lower end of each lever is formed with a fishtail 12 of uniform thickness, and the upper wall of the strut is widened over the lever to form a lower extension 13 that is offset inwardly so as to bear against fishtail 12. Additional support for the lever is provided, and the lower wall 11 of the strut is better protected from wear by widening the lower wall below the lever to form an upper extension 14 that is offset inwardly in order to bear against the lower surface of the lever above the pivot pin 16 that extends through aligned openings in the strut and lever. Inwardly offset strut extensions 13 and 14, by bearing against the upper and lower surfaces of the lever, hold it in a plane perpendicular to the axis of pivot pin 16 so as to prevent canting of the lever and the unequal and excessive wear resulting therefrom.

It is another feature of this invention that the portion of the lever around pin 16 is thickened to form a boss 17 projecting beyond the opposite faces of the lever and serving to hold the lever and strut together even though the pin is lost or the brake hangers fail. With the pin removed the lever cannot slide down through the strut slot because boss 17 will strike inwardly projecting portion 13 of the strut's upper wall. On the other hand, if the pin should be lost and the brake hangers break, the brake beam cannot fall because inwardly projecting portion 14 of the strut's lower wall will strike and hang on the top of the boss. For this same purpose it is preferred to also bend the upper edge portion 18 of the upper wall inwardly over the boss.

To assemble the lever and strut, the lever is inserted in the strut near the compression member 19 of the brake beam at a point 20 (Fig. 4) where the two walls of the strut are parallel. The lever is then moved outwardly in the strut toward the tension member 21 of the beam until boss 17 is in proper position with the opening through it in line with the strut openings. The pivot pin is then inserted through all of these openings to connect the lever to the strut.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. Railway car brake rigging comprising a bifurcated brake beam strut provided with aligned openings, a brake lever extending through said strut and provided with an opening in line with the strut openings, said lever opening being surrounded by an integral boss, and a pivot pin disposed in all of said openings, the lower edge portion of one side of the strut projecting inwardly under said boss.

2. Railway car brake rigging comprising a bifurcated brake beam strut provided with aligned openings, a brake lever extending through said strut and provided with an opening in line with the strut openings, said lever opening being surrounded by an integral boss, and a pivot pin disposed in all of said openings, the lower edge portion of one side of the strut projecting inwardly under said boss and the upper edge portion of one side of the strut projecting inwardly over said boss.

3. Railway car brake rigging comprising a brake beam strut provided with an inclined slot the upper and lower walls of which are provided with aligned openings, an inclined brake lever disposed in said slot and provided with an opening in line with the strut openings and surrounded by an integral boss, and a pivot pin disposed in all of said openings, the lower edge portion of said upper wall projecting inwardly under said boss and bearing against the upper surface of the lower end of the lever.

4. Railway car brake rigging comprising a brake beam strut provided with an inclined slot the upper and lower walls of which are provided with aligned openings, an inclined brake lever disposed in said slot and provided with an opening in line with the strut openings and surrounded by an integral boss, and a pivot pin disposed in all of said openings, the lower edge portion of said upper wall projecting inwardly under said boss and bearing against the upper surface of the lower end of the lever and the upper edge portion of said lower wall projecting inwardly over said boss and bearing against the lower surface of the lever above said pin.

5. Railway car brake rigging comprising a brake beam strut provided with an inclined slot the upper and lower walls of which are provided with aligned openings, an inclined brake lever disposed in said slot and provided with an opening in line with the strut openings, and a pivot pin disposed in all of said openings, the lower edge of said upper wall being provided with an extension offset inwardly and bearing against the upper surface of the lower end of the lever.

6. Railway car brake rigging comprising a brake beam strut provided with an inclined slot the upper and lower walls of which are provided with aligned openings, an inclined brake lever disposed in said slot and provided with an opening in line with the strut openings, and a pivot pin disposed in all of said openings, the upper edge of said lower wall being provided with an extension offset inwardly and bearing against the lower surface of the lever above said pin.

7. Railway car brake rigging comprising a brake beam strut provided with an inclined slot the upper and lower walls of which are provided with aligned openings, an inclined brake lever disposed in said slot and provided with an opening in line with the strut openings, and a pivot pin disposed in all of said openings, the lower edge of said upper wall being provided with an extension offset inwardly and bearing against the upper surface of the lower end of the lever, and the upper edge of said lower wall being provided with a similar extension bearing against the lower surface of the lever above said pin, whereby the lever is prevented from canting.

8. Railway car brake rigging comprising a brake beam strut having an inclined slot therethrough and provided with aligned openings, a brake lever extending through said strut and provided with an opening in line with the strut openings, said lever opening being surrounded by an integral boss, and a pivot pin disposed in all of said openings, the lower edge portion of the upper side of the strut projecting inwardly under said boss, and the lower end of the lever being formed with a fish tail engaged by said inwardly projecting edge portion of the strut.

9. Railway car brake rigging comprising a brake beam strut provided with an inclined slot the upper and lower walls of which are provided with aligned openings, an inclined brake lever disposed in said slot and provided at its lower end with an opening in line with the strut openings, and a pivot pin disposed in all of said openings, the upper edge only of said lower wall being provided with an extension projecting upwardly a material distance along the lower surface of the lever above said pin whereby to substantially eliminate canting of the lever in the strut and to increase the bearing areas between the lever and strut to thereby materially decrease wear at said bearing areas.

10. Railway car brake rigging comprising a brake beam strut provided with an inclined slot the upper and lower walls of which are provided with aligned openings, an inclined brake lever disposed in said slot and provided at its lower end with an opening in line with the strut openings, and a pivot pin disposed in all of said openings, the lower edge only of said upper wall being provided with an extension projecting downwardly a material distance along the upper surface of the lower end of the lever whereby to substantially eliminate canting of the lever in the strut and to increase the bearing areas between the lever and strut to thereby materially decrease wear at said bearing areas.

11. Railway car brake rigging comprising a brake beam strut provided with an inclined slot the upper and lower walls of which are provided with aligned openings, an inclined brake lever disposed in said slot and provided at its lower end with an opening in line with the strut openings, and a pivot pin disposed in all of said openings, the lower edge only of said upper wall being provided with an extension projecting downwardly a material distance along the upper surface of the lower end of the lever, and the upper edge only of said lower wall being provided with a similar extension projecting upwardly a material distance along the lower surface of the lever above said pin, whereby to substantially eliminate canting of the lever in the strut and to increase the bearing areas between the lever and strut to thereby materially decrease wear at said bearing areas.

FREDERIC SCHAEFER.